US007818856B2

(12) United States Patent
Raczuk

(10) Patent No.: US 7,818,856 B2
(45) Date of Patent: Oct. 26, 2010

(54) METHOD AND TOOL FOR MATING A HOSE AND CONNECTOR

(76) Inventor: Richard C. Raczuk, 405 Jones Dr., Lake Havasu, AZ (US) 86406

( * ) Notice: Subject to any disclaimer, the term of this patent is extended or adjusted under 35 U.S.C. 154(b) by 1078 days.

(21) Appl. No.: 10/752,110

(22) Filed: Jan. 6, 2004

(65) Prior Publication Data

US 2005/0144769 A1 Jul. 7, 2005

(51) Int. Cl.
*B23P 19/04* (2006.01)

(52) U.S. Cl. .............................. 29/237; 29/238; 29/270

(58) Field of Classification Search ................... 29/237, 29/235, 238, 243.56, 243.55, 270, 278, 280, 29/283.5
See application file for complete search history.

(56) References Cited

U.S. PATENT DOCUMENTS

| | | | | |
|---|---|---|---|---|
| 2,371,805 A | | 3/1945 | Cooper | |
| 3,675,951 A | | 7/1972 | Morin | |
| 4,750,762 A | * | 6/1988 | Corzine | 285/45 |
| 5,024,468 A | | 6/1991 | Barge | |
| 5,297,586 A | | 3/1994 | McIntosh | |
| 5,353,623 A | * | 10/1994 | Bobenhausen | 72/402 |
| 5,404,632 A | | 4/1995 | Zaborszki | |
| 5,480,193 A | * | 1/1996 | Echols et al. | 285/45 |
| 5,638,869 A | | 6/1997 | Zaborszki et al. | |
| 5,700,493 A | | 12/1997 | Scarazzo et al. | |
| 5,704,106 A | | 1/1998 | Sampson et al. | |
| 5,794,983 A | | 8/1998 | Melvin | |
| 5,884,383 A | | 3/1999 | Wolfe et al. | |
| 6,182,347 B1 | * | 2/2001 | Reed et al. | 29/426.5 |
| 6,270,126 B1 | | 8/2001 | Juedes | |
| 6,363,602 B1 | | 4/2002 | Clark | |
| 6,378,914 B1 | | 4/2002 | Quaranta | |
| 6,389,675 B1 | | 5/2002 | Tykoski et al. | |
| 6,425,171 B1 | | 7/2002 | Quaranta | |
| 6,434,990 B1 | | 8/2002 | Juedes | |
| 2002/0050041 A1 | | 5/2002 | Viegener | |

* cited by examiner

*Primary Examiner*—Lee D Wilson
(74) *Attorney, Agent, or Firm*—Krieg DeVault LLP

(57) ABSTRACT

A tool adapted for assembling a hose material within a connector opening. In one form the present application relates to a tool for introducing the frayed braided wires at the cut end of a braided hose into a connector/socket.

25 Claims, 7 Drawing Sheets

METHOD AND TOOL FOR MATING A HOSE AND CONNECTOR

BACKGROUND OF THE INVENTION

The present invention relates generally to a method and apparatus for mating an end of a braided hose to a connector/socket. More particularly, one form of the present invention relates to a tool for introducing the frayed braided wires at the cut end of a braided hose into a connector/socket. Although the present application was developed for application with braided wire hoses, certain applications may exist with other types of hoses.

Hoses are utilized in a wide variety of applications to convey a fluid to a mechanical device in order to cause the device to perform a desired function. In order to connect the hose with the device or to other hoses a connector/socket is typically attached to each end of the hoses. The connector/socket is than mated with a corresponding connector/socket to provide a fluid tight junction.

The demand for a diverse number of hose lengths makes it often more efficient to make up the hose assembly as needed in the required length and connector configuration. Bulk hose material is available in large rolls having differing diameters. The hose material is often contained within a sheath or outer cover which is typically formed of braided or intermeshing wire. Upon the hose material being cut to length the sheath at each end of the material is typically disturbed or is frayed due to the cutting and separation from the roll of material. Disturbed or frayed sheath often makes the assembly of the hose material with the connector/socket an undesirable activity. As an individual is working at placing the hose material within the connector/socket they are exposed to the disturbed and/or frayed sheath that can result in cuts to the fingers, discomfort and/or annoyance.

Therefore, a need exists for a tool to be utilized for mating of an end of a braided hose with a connector/socket while minimizing the exposure of the individual to contact with the frayed ends of the sheath. The present invention satisfies this need in a novel and non-obvious way.

SUMMARY

One form of the present invention contemplates a tool for assembling a hose material within a connector opening in a connector. The tool comprising: a body having a first portion to locate the connector with the connector opening in a first position, and a converging passage having an inlet adapted for receiving an end of the hose material with a disturbed sheath and an outlet in registry with the connector opening when in the first position, the converging passage defined by a surface that constrains the size of the disturbed sheath as it passes from the inlet to the outlet, wherein the outlet is no larger than the connector opening.

Another form of the present invention contemplates a tool for placing a hose within an opening in a socket. The tool comprising: a body including a socket holder to fixture the socket with the opening in a first position; and means for reducing the diameter of the hose with a disturbed sheath to the size of the opening in the socket, wherein the means including a confining path adapted for the passage of the hose to the opening within the socket.

Another form of the present invention contemplates a tool for placing a hose with a braided sheath within an opening in a connector. The tool comprising: a multi-part body including an internal cavity for receiving the connector in a fixed position; and a converging passage having an inlet adapted for receiving an end of the hose with a disturbed sheath and an outlet aligned with the connector opening when the connector is in the fixed position, the converging passage defined by a frustum conical surface that reduces the diameter of the disturbed sheath as it passes from the inlet to the outlet, wherein at the outlet the diameter of the hose and sheath has been reduced by the frustum conical surface to no larger than the connector opening.

In yet another form of the present invention there is contemplated a method for aligning a hose with an opening within a hose connector. The method comprising: positioning the hose connector with the opening in a first position; introducing an end of the hose with a disturbed sheath into a converging confined passage; reducing the diameter of the hose with disturbed sheath as it passes through the confined passage to the diameter of the opening; and inserting the end of the hose into the opening after the reducing.

One object of the present invention is to provide a unique tool for introducing the end of a braided hose into a connector/socket.

Related objects and advantages of the present invention will be apparent from the following description.

DESCRIPTION OF THE PREFERRED EMBODIMENTS

Figure 1:
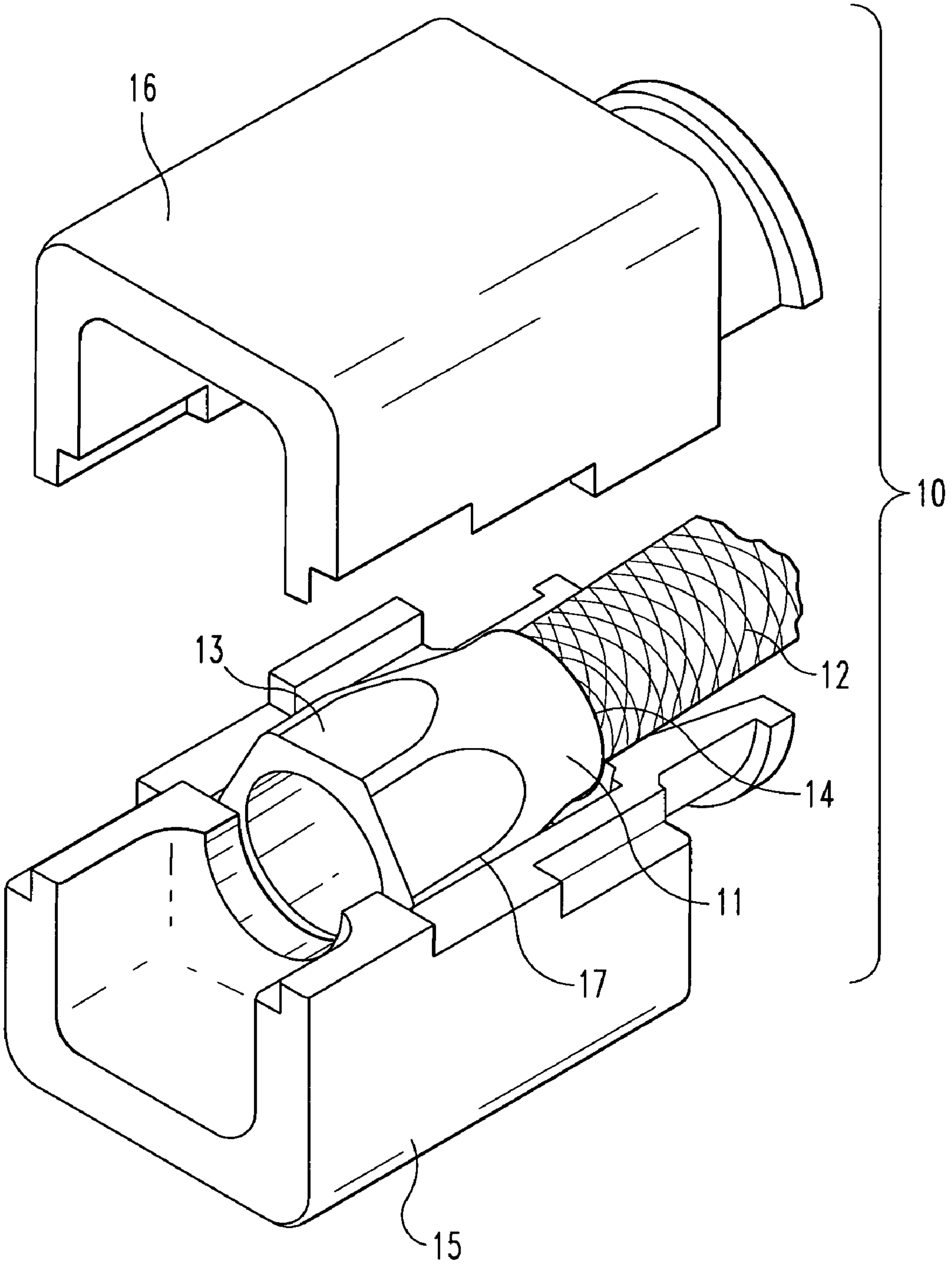
FIG. 1 is a partially exploded view of a tool comprising one form of the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present application is generally directed to a tool for introduction of an end of a hose having an outer sheath into a connector/socket to comprise a hose assembly. As contemplated herein the hose comprises an outer sheath which may comprise, by way of example and without limitation, braided or intermeshing wire. The hose is available in a variety of diameters and in roll or bulk lengths. The connector is selectively attached to the end(s) of the hose and over the frayed outer sheath portion in order to form a hose assembly to be connected to other hoses, apparatuses and/or sources of fluid. Connectors have an opening for receipt of the hose therein and typically an outer engagement surface such as, but not limited to a hexagonal portion. A person skilled in the art will understand that the opening within the connector is sized for receipt of a specified hose diameter. The hexagonal portion is engaged by a wrench or pliers during the connection of the hose assembly to other hoses, apparatuses and/or sources of fluid.

With reference to FIG. 1, there is illustrated an exploded view of one embodiment of the tool 10. Tool 10 is illustrated with a hose assembly 11 therein which comprises a hose 12 with a connector 13. In one form the tool 10 includes a body member for receiving and locating the connector 13 in a predetermined position. The body includes a locating feature 17 to place the opening 14 in the end of the connector 13 in a fixed location to enable mating with the hose 12. In one embodiment the body member includes a plurality of body portions which hare separable to allow placement of the connector 13 within the tool 10. In a preferred form the tool 10 includes a pair of main bodies 15 and 16 which are separable to allow placement of the connector 13 within the tool 10. The connector 13 is held in position within the tool 10 and relative movement between the hose 12 and the tool 10 advances the end of the hose into the opening 14 within the connector 13. During the passage of the end of the hose 12 into the opening 14 of the connector 13 the tool functions to shield the user from the frayed and/or disturbed portion of the sheath.

Figure 2:
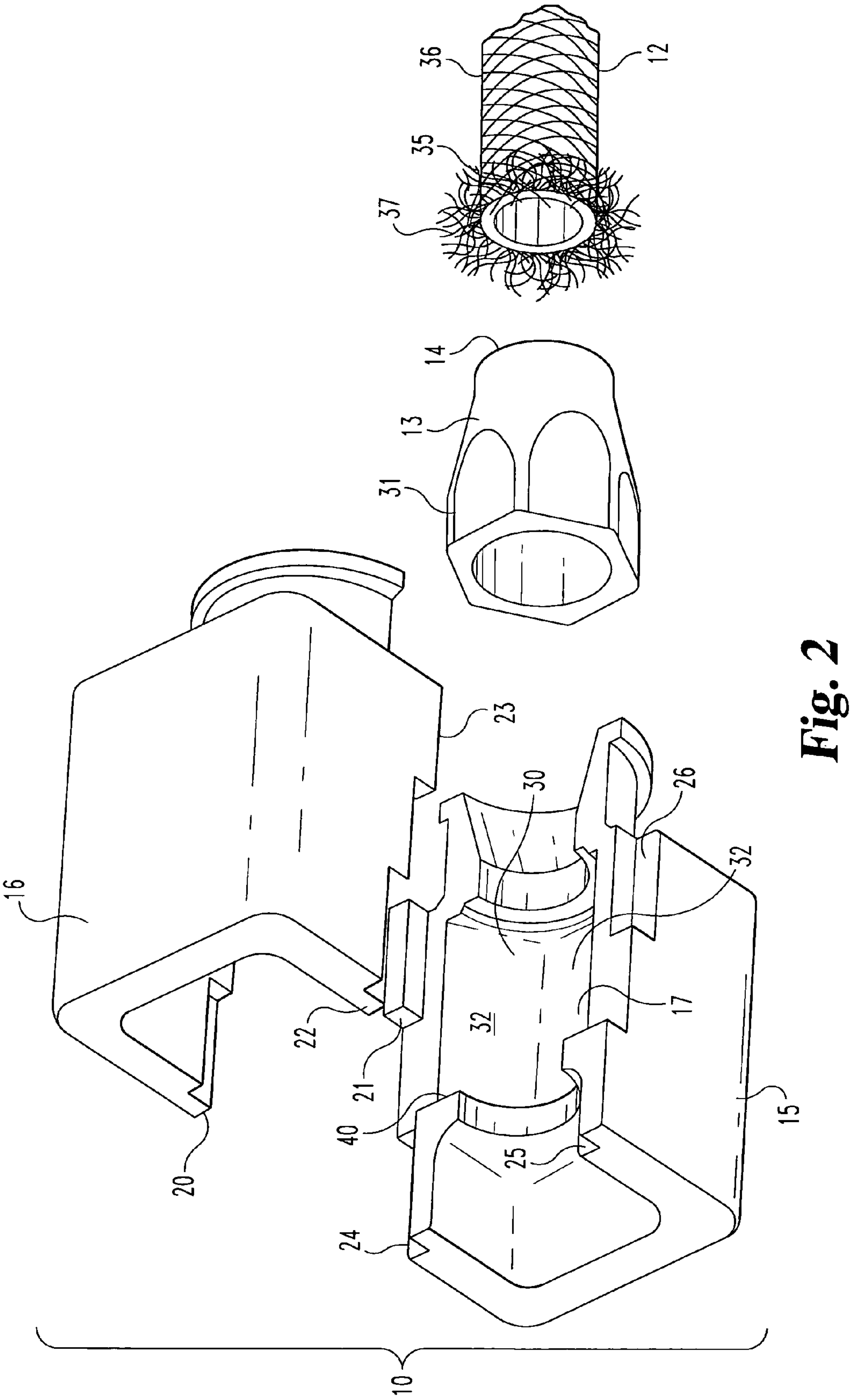
FIG. 2 is a further exploded view of the tool of FIG. 1.

With reference to FIG. 2, there is illustrated a further exploded view of the tool 10. The main bodies 15 and 16 are positioned relative to one another in an abutting relationship. In one form of the present invention the main bodies 15 and 16 include a nesting structure to precisely locate the bodies relative to one another. In the embodiment illustrated the nesting structure includes a plurality of legs 20, 21, 22 and 23 that mate with leg-receiving channels 24, 25, 26 and 27 (not illustrated). The engagement between the legs 20, 21, 22 and 23 and the leg receiving channels 24, 25, 26 and 27 facilitate alignment and security between the main bodies 15 and 16. The main bodies may then be held securely together by a variety of methods including, but not limited to clamping and/or the utilization of fasteners.

Connector 13 is located within a connector receiving portion 30 formed by the main bodies 15 and 16. In one form the connector-receiving portion 30 is configured so that the connector 13 is located in a fixed location with a desired axial and radial orientation. The connector-receiving portion 30 limits substantial movement and/or misalignment of the connector 13 as the hose 12 is brought into the opening 14 within the connector 13. In one form the connector-receiving portion 30 defines a shape corresponding to the shape of a portion of the connector 13. In a preferred form the connector-receiving portion 30 includes a hexagonal shape that matches the hexagonal portion 31 of the connector 13. The hexagonal shape is defined by a plurality of surfaces 32 formed on the main bodies 15 and 16. The connector receiving portion including a semi-hexagonal portion in the main body 15 and a semi-hexagonal portion in the main body 16 (not illustrated). The corresponding surfaces 32 within the connector-receiving portion 30 define a hexagonal shape corresponding to the general shape of the connector. An axial locating feature 40 defines a stop to limit the axial movement of the connector 13 within the connector-receiving portion 30. The surfaces 32 and axial locating feature 40 functions to support and locate the connector 13 within the tool 10.

In FIG. 2, there is an illustrative view of the end 35 of hose 12. The hose 12 includes an outer sheath 36 that has been disturbed by the cutting and/or separation of the length of hose material from the roll or bulk supply of hose material. The outer sheath may comprise, by way of example and without limitation, braided or intermeshing wire. The end 35 includes a region 37 where the outer sheath has become disturbed and the portions of the sheath extend beyond the nominal diameter of the hose. The disruption/disturbance of the outer sheath may take the form of twisted, unwound, and/or frayed. The result is that the size and orientation of the portions of the sheath at the disturbance do not facilitate insertion into the opening 14 of the connector 13.

Figure 4:
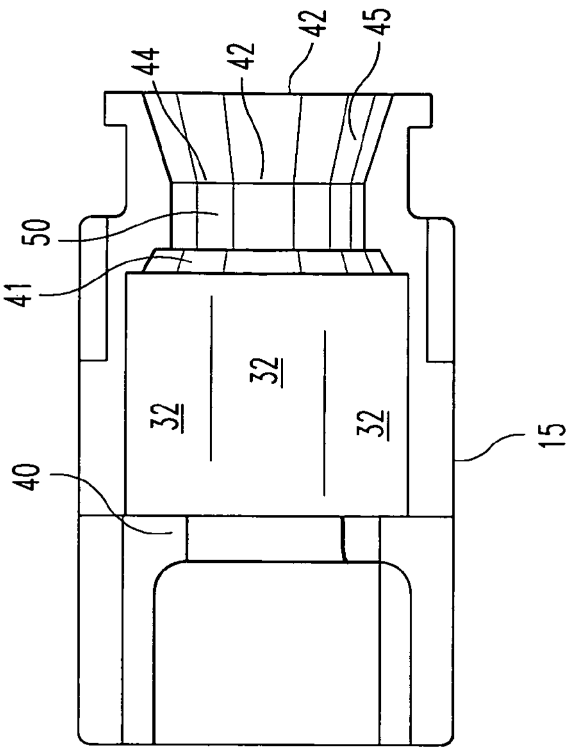
FIG. 4 is a top plan view of the tool body member of FIG. 3.
Figure 3:
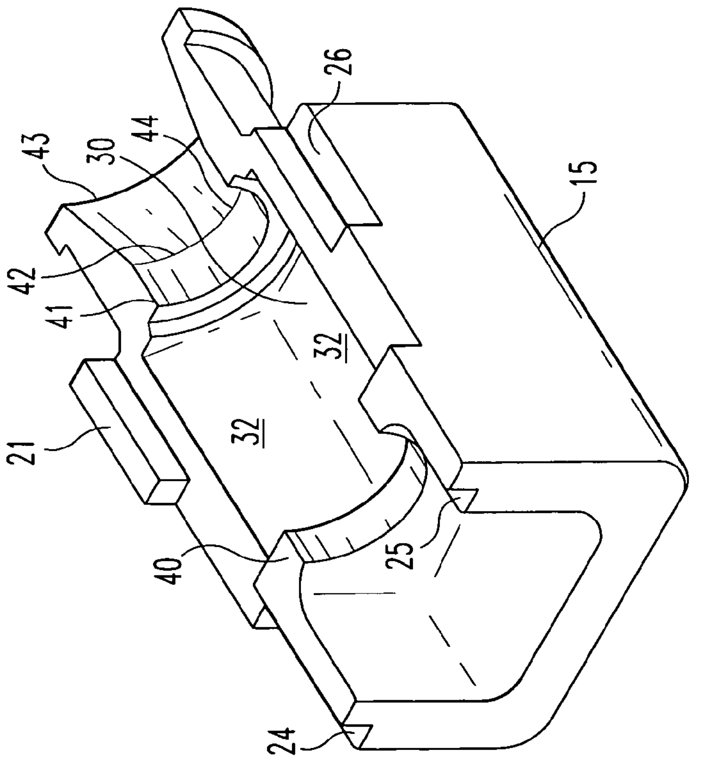
FIG. 3 is perspective view of a tool body member comprising a portion of the tool of FIG. 1.

With reference to FIGS. 3 and 4, there is illustrated one embodiment of the main body 15. The description will be made with reference to main body 15 but is equally applicable to the corresponding main body 16. In one form, the main body 16 is formed of a material or a coated material having properties appropriate to withstanding the wear and abrasion associated with the passage of metal fibers thereagainst. However, other materials are contemplated herein for the formation of the main body, as will be contemplated by someone of ordinary skill in the art. As discussed above the connector-receiving portion 30 locates the connector within the tool 10. The opening 14 of the connector is positioned at a fixed location 41 within the tool 10. A hose confining passage 42 is formed in the main body 15 and is in operative communication with the opening 14 of the connector 13. The main bodies 15 and 16 cooperate to define a closed passage around the portion of the hose 12 that is passed into the opening 14 of the connector 13. The hose confining passage 42 has an inlet 43 for receiving the hose with the disturbed sheath region 37 and an outlet 44 aligned with the opening 14 of connector 13. In one form the outlet 44 is sized to about the diameter of the opening 14. In another form the outlet 44 is sized to be no larger than the opening 14 in the connector.

The hose confining passage 42 includes a consolidating portion 45 which facilitates the consolidation of the disturbed sheath region 37 from the diameter at the inlet 43 to the diameter defined at the outlet 44. The diameter at the outlet 44 allows the ready insertion of the hose with the disturbed sheath region 37 into the opening 14. In a preferred form the hose confining passage includes a converging passage disposed between the inlet 43 and the outlet 44. A wall surface formed on the main bodies 15 and 16 functions to confine and reduce the diameter of the hose with disturbed sheath region 37 as it is advanced to the opening 14. In one form the converging passage is a of a frustum conical shape. In one form the half angle of the consolidation portion is within a range of about 10° to about 45 and in another form is about 15°. While the converging passage has been illustrated as opening to a fixed diameter passage 50, it is contemplated herein that the converging passage could open directly adjacent the opening 14 of the connector 13, thereby omitting the fixed diameter passage.

Figure 5:
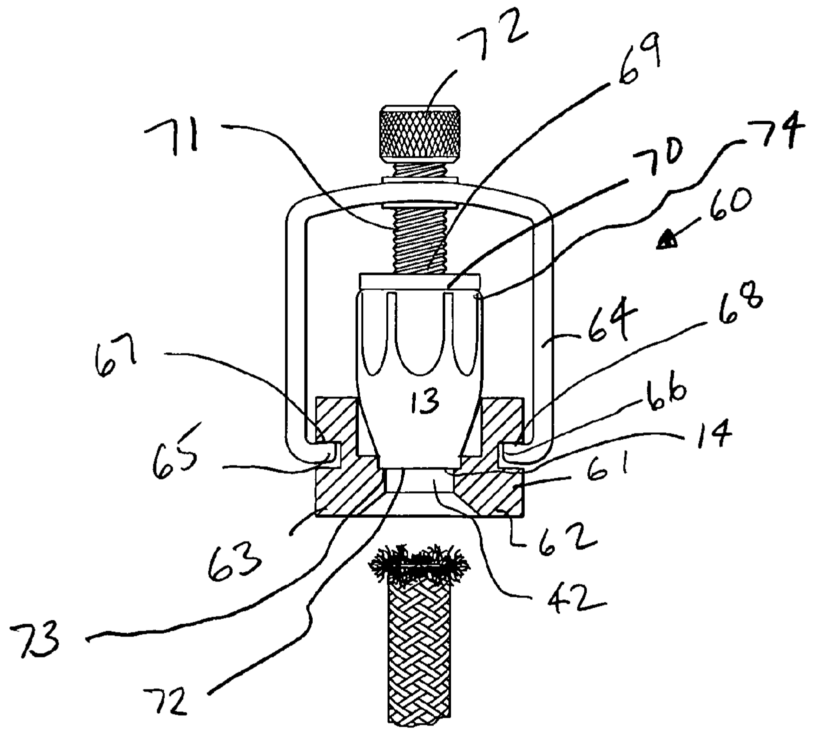
FIG. 5 is an illustrative sectional view of another tool comprising another form of the present invention.

With reference to FIG. 5, there is illustrated another embodiment of the tool 60 of the present invention. The tool 60 includes a main body 61 formed of a plurality of members 62 and 63 that are separable. In one form of the invention the plurality of members defines a pair of members that are coupled together to define the main body 61. An axial positioning member 64 is coupled to the main body 61. In one form the axial positioning member includes ends 65 and 66 that are received within slots 67 and 68 respectively. In one form axial positioning member 64 includes an adjustable restraint 69. The adjustable restraint 69 includes a connector engagement portion 70, a threaded portion 71 and an actuation portion 72. As described for the embodiment set forth in FIG. 2, the main body member includes a hose confining passage 42 that is in operative communication with the opening 14 of the connector 13. The connector having one end 72 abutting a locating surface 73 formed on the main body 61. The other end 74 of the connector 13 is disposed in an abutting relationship with the connector engagement portion 70. The connector end 72 is located adjacent the locating surface 73 of the tool 60 and the connector engagement portion 70 bears upon the other end of the connector to maintain the relationship.

Figure 6:
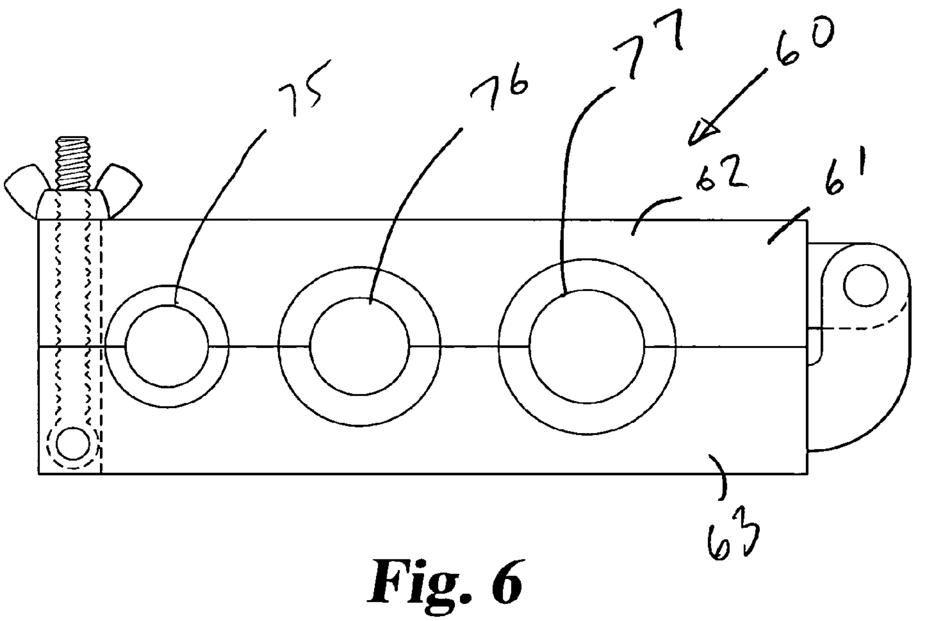
FIG. 6 is a top plan view of another tool comprising another form of the present invention.

With reference to FIG. 6, there is illustrated a top plan view of one form of tool 60. The main body 61 has a plurality of connector receiving apertures 75, 76 and 77. While the embodiment set forth in FIG. 6 illustrates three connector receiving apertures it is contemplated herein that the tool may contain from one to a plurality of connector receiving apertures. More specifically, the tool is not limited to three connector-receiving apertures. Further details are not believed necessary as the embodiment of FIG. 6 should be understood by those skilled in the art after review of the other embodiments set forth previously in this description.

Figure 7A:
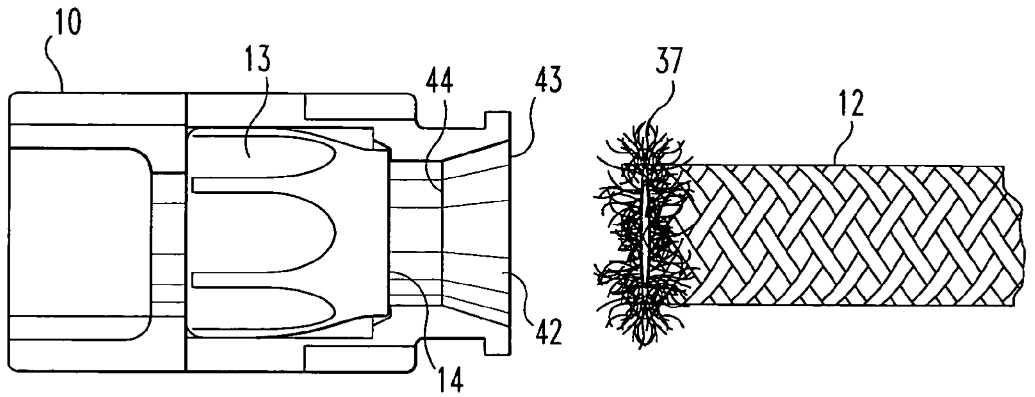
FIG. 7*a* is a schematic representation of a hose connector disposed within one form of the tool of the present invention prior to the hose being introduced into the tool.
Figure 7B:
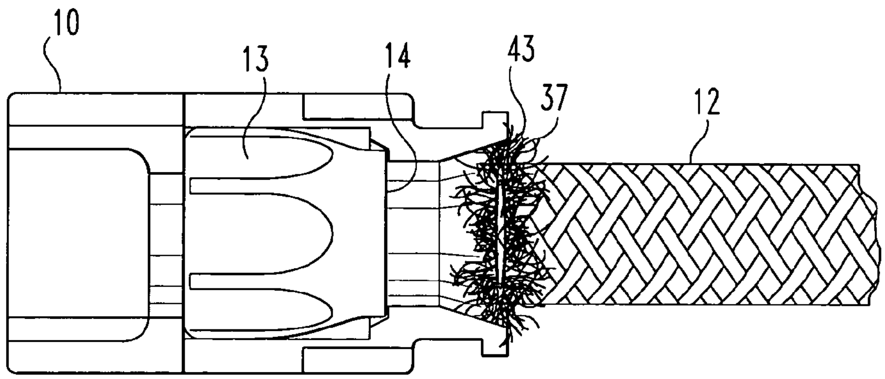
FIG. 7*b* is a schematic representation of the hose being fed into the tool.
Figure 7C:
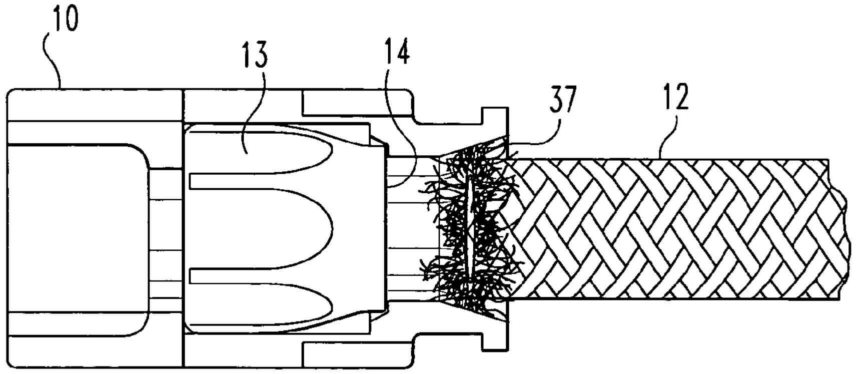
FIG. 7*c* is a schematic representation of the hose passing further into the tool to facilitate introduction of the hose into the connector.
Figure 7D:
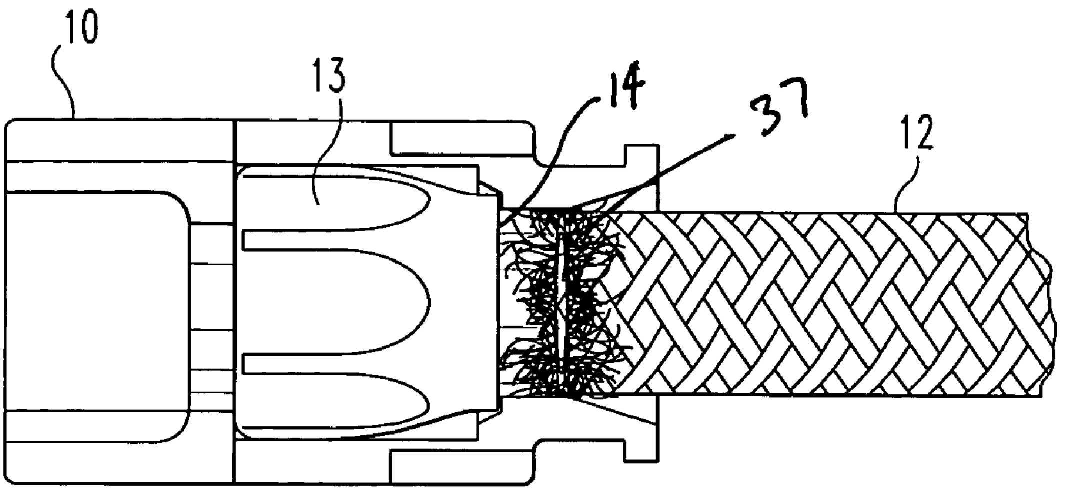
FIG. 7*d* is a schematic representation of the hose passing further into the tool before introduction of the end of the hose into the connector.
Figure 7E:
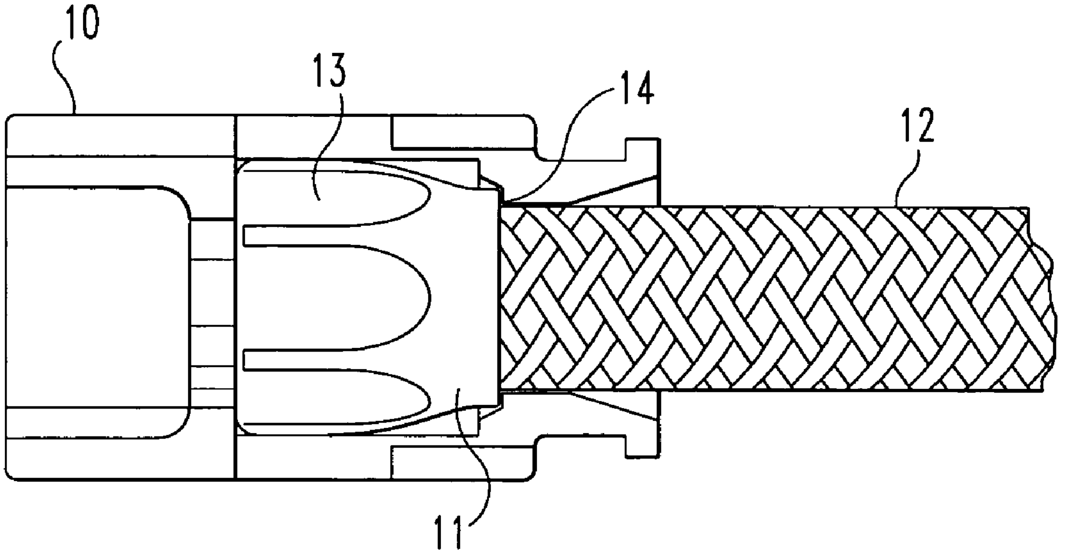
FIG. 7*e* is a schematic representation of the end of the hose positioned within the connector.

With reference to FIGS. 7*a*-7*e*, there is illustrated the passage of the hose 12 with the disturbed sheath region 37 into the opening 14 within the connector 13. In FIG. 7*a* the hose 12 is not engaged with the tool 10. In one form of the present invention, a lubricant is applied to the end of the hose prior to and/or during insertion of the hose into the tool 10. However, the present application also contemplates the insertion of the hose into the tool without lubrication. With reference to FIGS. 7*b* and 7*c*, there is illustrated the end of the hose and disturbed sheath region 37 being advanced through the inlet 43 and into the converging passage. The wall surface defining the converging passage functions to reduce the diameter of the disturbed sheath region 37 as the hose is advanced into the tool. With reference to FIG. 3*d*, there is illustrated the hose with disturbed sheath region 37 at the outlet 44. The passage of the hose with disturbed sheath region 37 through the converging passage has reduced the diameter of the disturbed sheath region 37 to the desired diameter for insertion into opening 14 in connector 13. Referring to FIG. 3*e*, there is illustrated the end of the hose with disturbed sheath region 37 located within opening 14 of the connector. The tool 10 is now opened and the connector can be removed and finally connected to the hose by known methods such as, but not limited to, crimping.

The utilization of the tool 60 to connect the hose to the opening 14 within the connector 13 is very similar to the utilization of the tool 10. However, the setting and placement of the connector 13 within the tool 60 is different. The members 62 and 63 are separated to allow the placement of the connector 13 therein in an abutting relationship with the locating surface 73. The members 62 and 63 are than held together and the connector engagement portion 70 is brought into contact with the connector 13. The actuation portion 72 is turned to securely engage the connector 13 between the locating surface 73 and the connector engagement portion 70. The hose is than mated with the connector in a process substantially similar to that described with reference to FIGS. 7*a*-7*e*.

Figure 8:
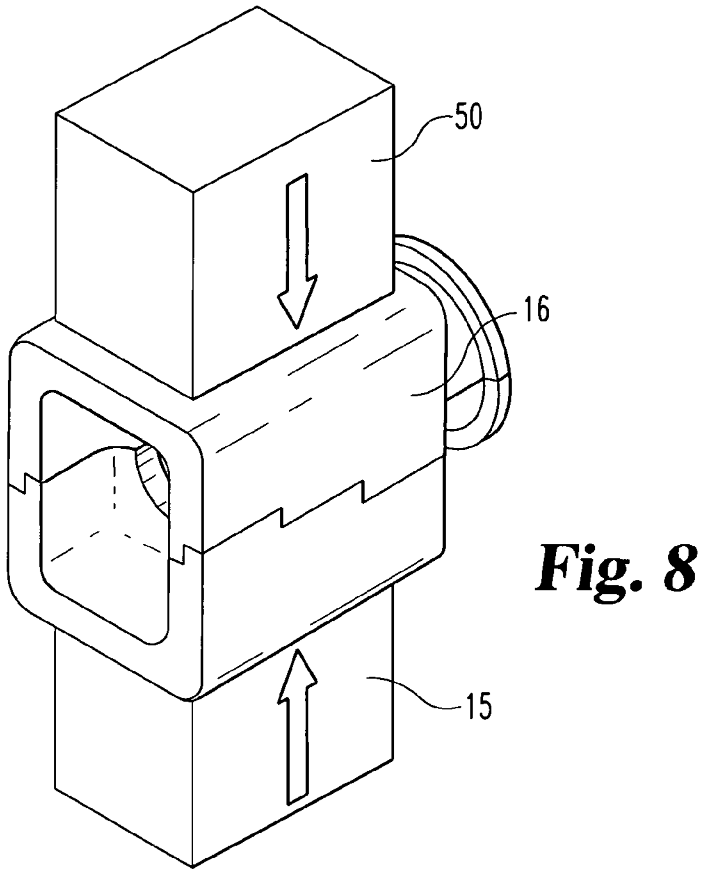
FIG. 8 is a schematic illustration of the tool of FIG. 1 being held in a clamping device.
Figure 9:
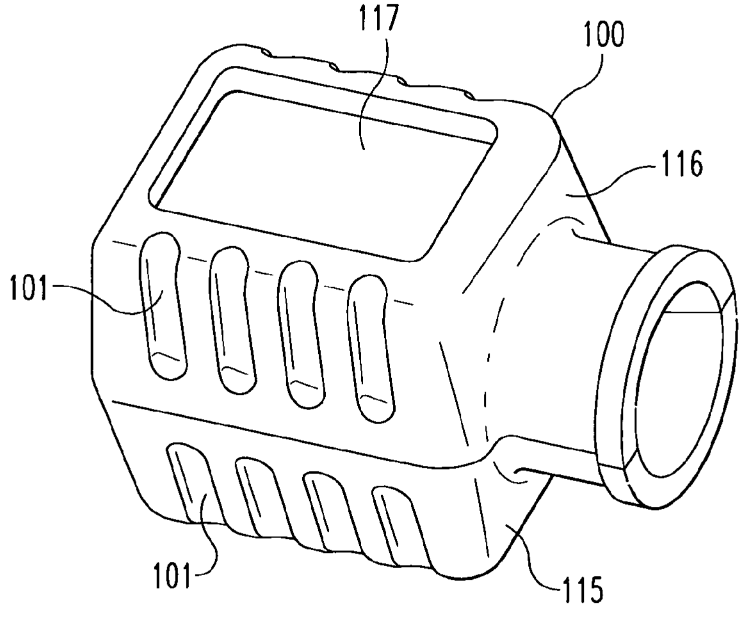
FIG. 9 is a perspective view of an alternate embodiment of the tool of the present invention.

With reference to FIG. 8, there is illustrated the tool 10 having the main bodies clamped together by a fixture 50. The fixture 50 may be hand held or bench mounted. The present application contemplates that the fixture 50 may include a hand held or moveable clamping device including but not limited to a socket, vice, fixture, band, fastener. In FIG. 9, there is illustrated an alternate embodiment of the tool 100. Tool 100 is substantially similar to tool 10 and like feature numbers will be utilized to represent like features. A distinguishing attribute between the tool 10 and the tool 100 is the integration of grasping channels 101 in the main bodies 115 and 116. Further, the main body 116 includes a identification receiving surface 117 recessed within the body. In another aspect of the present application there is contemplated that the tooling for facilitating the insertion of the hose 12 within the connector 13 can be utilized within an automated or robotic type of system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word "preferable," "preferably" or "preferred" in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an", "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A tool for assembling a hose material within a connector opening in a connector, comprising:

a body having a first portion to locate the connector with the connector opening in a first position, and a converging passage having an inlet adapted for receiving an end of the hose material with a disturbed sheath and an outlet in registry with the connector opening when in said first position, said converging passage defined by a surface that constrains the size of the disturbed sheath as it passes from said inlet to said outlet, wherein said outlet is no larger than the connector opening.

2. The tool of claim 1, wherein said body adapted to trap the connector therein and prevent any substantial rotating or axial movement of the connector relative to said body.

3. The tool of claim 2, wherein said body includes a pair of main body members.

4. The tool of claim 1, which further includes a fixed diameter passage between said outlet and the connector opening for the passage of the hose material.

5. The tool of claim 1, wherein said converging passage includes a partial conical shape.

6. The tool of claim 1, which further includes a second member coupled to said body and bearing against the end of the connector located away from the connector opening to hold the connector in a fixed relationship with said body.

7. The tool of claim 6, wherein said second member includes an axial positioning member and an adjustable restraining member, the adjustable restraining member including a bearing surface to abut the end of the connector away from the connector opening.

8. The tool of claim 6, wherein said body is formed by a pair of main body members, and wherein said main body members are separable.

9. The tool of claim 6, which further includes a substantially constant diameter passage extending between said outlet and the connector opening.

10. A tool for placing a hose within an opening in a socket, comprising:

a body including a socket holder to fixture the socket with the opening in a first position; and means for reducing the diameter of the hose with a disturbed sheath to the size of the opening in the socket, wherein said means including a confining path adapted for the passage of the hose to the opening within the socket.

11. The tool of claim 10, wherein said body includes a pair of separable mating members, and further wherein said socket holder is defined substantially within said body and prevents movement of said socket relative to said body.

12. The tool of claim 11, wherein said socket holder corresponds to the shape of a portion of the socket.

13. The tool of claim 10, wherein said confining path includes a reducing diameter portion with a diameter that decreases from a first location to a second location within said confining path.

14. The tool of claim 13, wherein said confining path includes fixed diameter portion adjacent to said reducing diameter portion.

15. The tool of claim 10, which further includes a fixturing member coupled to said body, said fixturing member being adjustable to bear against an end of the socket and hold the socket in a fixed location.

16. The tool of claim 15, wherein said member includes a support arm and an adjustable restraint member coupled thereto, said adjustable restraint member having an abutment surface to bear against an end of the socket thereby holding the socket to the body.

17. The tool of claim 16, wherein said body is formed by a pair of body members.

18. A tool for placing a hose with a braided sheath within an opening in a connector, comprising:

a multi-part body including an internal cavity for receiving the connector in a fixed position; and a converging passage having an inlet adapted for receiving an end of the hose with a disturbed sheath and an outlet aligned with the connector opening when the connector is in said fixed position, said converging passage defined by a frustum conical surface that reduces the diameter of the disturbed sheath as it passes from said inlet to said outlet, wherein at said outlet the diameter of the hose and sheath has been reduced by said frustum conical surface for insertion into the connector opening.

19. The tool of claim 10, wherein said body includes a plurality of spaced socket holders, each of said socket holders adapted to receive different size sockets.

20. The tool of claim 18, wherein said multi-part body trapping the connector within said internal cavity and preventing any substantial rotation or axial movement of the connector relative to said body.

21. The tool of claim 18, wherein at said outlet the diameter of the hose and sheath has been reduced by said frustum conical surface to no larger than the connector opening.

22. The tool of claim 21, which further includes a second member coupled to said body and bearing against the end of the connector away from the connector opening to hold the connector in a fixed relationship with said body.

23. The tool of claim 21, which further includes clamping means for holding the connector in a fixed position relative to said body.

24. The tool of claim 23, wherein said clamping means including a member coupled to said body and being adjustable to bear against an end of the connector and hold the connector in a fixed position relative to said body.

25. The tool of claim 18, which further includes a fixed diameter passage between said outlet and the connector opening.

* * * * *